US012696282B2

(12) United States Patent
Takeda et al.

(10) Patent No.: US 12,696,282 B2
(45) Date of Patent: Jul. 28, 2026

(54) BANDWIDTH PART (BWP) OPERATIONS FOR MULTI-CELL SCHEDULING

(71) Applicant: QUALCOMM Incorporated, San Diego, CA (US)

(72) Inventors: Kazuki Takeda, Tokyo (JP); Wanshi Chen, San Diego, CA (US); Juan Montojo, San Diego, CA (US); Peter Gaal, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 850 days.

(21) Appl. No.: 17/451,079

(22) Filed: Oct. 15, 2021

(65) Prior Publication Data

US 2022/0124687 A1 Apr. 21, 2022

Related U.S. Application Data

(60) Provisional application No. 63/094,773, filed on Oct. 21, 2020.

(51) Int. Cl.
*H04W 72/23* (2023.01)
*H04L 5/00* (2006.01)
*H04W 72/0453* (2023.01)

(52) U.S. Cl.
CPC ............. *H04W 72/23* (2023.01); *H04L 5/001* (2013.01); *H04L 5/0044* (2013.01); *H04L 5/0094* (2013.01); *H04W 72/0453* (2013.01)

(58) Field of Classification Search
CPC .. H04W 72/23; H04W 72/0453; H04L 5/001; H04L 5/0044; H04L 5/0094
See application file for complete search history.

(56) References Cited

U.S. PATENT DOCUMENTS 11,812,440 B2 * 11/2023 Takeda .............. H04W 72/0453
2019/0103954 A1 * 4/2019 Lee ..................... H04W 52/146
(Continued)

FOREIGN PATENT DOCUMENTS

| CN | 109996338 A | 7/2019 |
|----|-------------|--------|
| CN | 110719643 A | 1/2020 |

(Continued)

OTHER PUBLICATIONS

English Translation of WO 2019/193768 A1, 2019, Retrieved from PE2E Search on Jul. 30, 2024. (Year: 2019).*

(Continued)

*Primary Examiner* — Omar J Ghowrwal
(74) *Attorney, Agent, or Firm* — QUALCOMM Incorporated

(57) ABSTRACT

Certain aspects of the present disclosure provide techniques for techniques for bandwidth part (BWP) operations when a user equipment (UE) is configured with multi-cell physical downlink shared channel (PDSCH) or physical uplink shared channel (PUSCH) scheduling. A method that may be performed by a UE includes receiving, from a base station (BS), first downlink control information (DCI) indicating whether resources are allocated for at least one data channel on multiple carriers, the first DCI configuring at least one BWP configuration to be activated on the multiple carriers, interpreting the first DCI based on the at least one BWP (Continued)

configuration to be activated, and communicating with the BS in accordance with the first DCI as interpreted based on the at least one BWP configuration.

30 Claims, 10 Drawing Sheets

(56) References Cited

U.S. PATENT DOCUMENTS

| | | | |
|---|---|---|---|
| 2019/0357238 A1 | 11/2019 | Zhou et al. | |
| 2021/0075558 A1* | 3/2021 | Takeda | H04W 72/23 |
| 2021/0185648 A1* | 6/2021 | Bai | H04L 5/0094 |
| 2023/0020414 A1* | 1/2023 | Harada | H04W 72/12 |

FOREIGN PATENT DOCUMENTS

| | | | |
|---|---|---|---|
| WO | 2019019376 A1 | 1/2019 | |
| WO | 2019193768 A1 | 10/2019 | |
| WO | 2020053943 A1 | 3/2020 | |
| WO | 2020204561 A1 | 10/2020 | |

OTHER PUBLICATIONS

Ericsson: "Discussion on Single DCI Scheduling POSCH on Multiple Cells", 3GPP Draft, 3GPP TSG-RAN WG1 #102-e, R1-2006672, 3rd Generation Partnership Project (3GPP), Mobile Competence Centre, 650, Route Des Lucioles, F-06921 Sophia-Antipolis Cedex, France, vol. RAN WG1, No. eMeeting, Aug. 17, 2020-Aug. 28, 2020, Aug. 8, 2020 (Aug. 8, 2020), XP051918186, 3 Pages.
International Search Report and Written Opinion—PCT/US2021/071913—ISA/EPO—Feb. 23, 2022.
Qualcomm Incorporated: "Views on Multi-cell POSCH Scheduling Via a Single DCI", 3GPP Draft, 3GPP TSG-RAN WG1 #102-e, R1-2006834, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020 (Aug. 8, 2020), XP051918284, 4 Pages.
ZTE: "Discussion on Multi-Cell PDSCH Scheduling via a Single DCI", 3GPP TSG RAN WG1 Meeting #102-e, R1-2005441, e-Meeting, Aug. 17, 2020-Aug. 28, 2020, pp. 1-8, Aug. 8, 2020.

* cited by examiner

400

420

500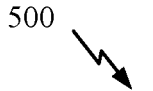

505

RECEIVING, BY A USER EQUIPMENT (UE), FROM A BASE STATION (BS), a FIRST DOWNLINK CONTROL INFORMATION (DCI) INDICATING WHETHER RESOURCES ARE ALLOCATED FOR AT LEAST ONE DATA CHANNEL ON MULTIPLE CARRIERS, THE FIRST DCI CONFIGURING AT LEAST ONE BWP CONFIGURATION TO BE ACTIVATED ON THE MULTIPLE CARRIERS

510

INTERPRETING, BY THE UE, THE FIRST DCI BASED ON THE AT LEAST ONE BWP CONFIGURATION TO BE ACTIVATED

515

COMMUNICATING, BY THE UE, WITH THE BS IN ACCORDANCE WITH THE FIRST DCI AS INTERPRETED BASED ON THE AT LEAST ONE BWP CONFIGURATION

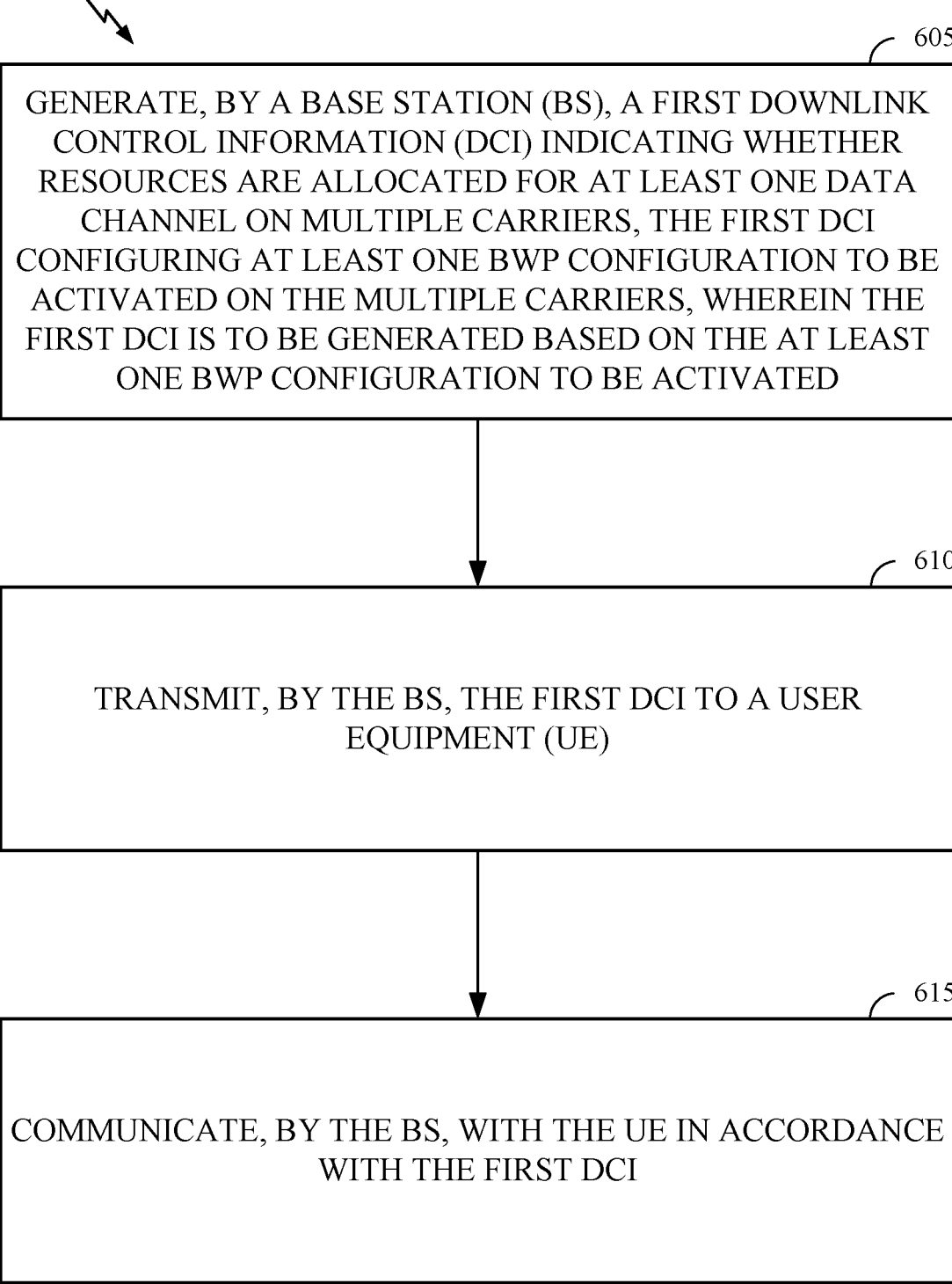

605

GENERATE, BY A BASE STATION (BS), A FIRST DOWNLINK CONTROL INFORMATION (DCI) INDICATING WHETHER RESOURCES ARE ALLOCATED FOR AT LEAST ONE DATA CHANNEL ON MULTIPLE CARRIERS, THE FIRST DCI CONFIGURING AT LEAST ONE BWP CONFIGURATION TO BE ACTIVATED ON THE MULTIPLE CARRIERS, WHEREIN THE FIRST DCI IS TO BE GENERATED BASED ON THE AT LEAST ONE BWP CONFIGURATION TO BE ACTIVATED

610

TRANSMIT, BY THE BS, THE FIRST DCI TO A USER EQUIPMENT (UE)

615

COMMUNICATE, BY THE BS, WITH THE UE IN ACCORDANCE WITH THE FIRST DCI

FIG. 6

BANDWIDTH PART (BWP) OPERATIONS FOR MULTI-CELL SCHEDULING

CROSS-REFERENCE TO RELATED APPLICATION(S)

This application claims priority to U.S. Provisional Application No. 63/094,773 filed Oct. 21, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for multi-cell scheduling.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include bandwidth part (BWP) operations, BWP selection, and/or BWP switching, for multi-cell scheduling.

Certain aspects of the subject matter described in this disclosure can be implemented in a method for wireless communication by a user equipment (UE). The method generally includes receiving, from a base station (BS), first downlink control information (DCI) indicating whether resources are allocated for at least one data channel on multiple carriers, the first DCI configuring at least one BWP configuration to be activated on the multiple carriers, interpreting the first DCI based on the at least one BWP configuration to be activated, and communicating with the BS in accordance with the first DCI as interpreted based on the at least one BWP configuration.

Certain aspects of the subject matter described in this disclosure can be implemented in a method for wireless communication by a BS. The method generally includes generating first DCI indicating whether resources are allocated for at least one data channel on multiple carriers, the first DCI configuring at least one BWP configuration to be activated on the multiple carriers, wherein the first DCI is to generated based on the at least one BWP configuration to be activated, transmitting the first DCI to a UE, and communicating with the UE in accordance with the first DCI.

Certain aspects of the subject matter described in this disclosure can be implemented in an apparatus for wireless communication by a UE. The apparatus generally includes: a memory; and one or more processors coupled to the memory, the memory and the one or more processors being configured to: receive, from a BS, first DCI indicating whether resources are allocated for at least one data channel on multiple carriers, the first DCI configuring at least one BWP configuration to be activated on the multiple carriers, interpret the first DCI based on the at least one BWP configuration to be activated, and communicate with the BS in accordance with the first DCI as interpreted based on the at least one BWP configuration.

Certain aspects of the subject matter described in this disclosure can be implemented in an apparatus for wireless communication by a BS. The apparatus generally includes: a memory; and one or more processors coupled to the memory, the memory and the one or more processors being configured to: generate first DCI indicating whether resources are allocated for at least one data channel on multiple carriers, the first DCI configuring at least one BWP configuration to be activated on the multiple carriers, the first DCI being generated based on the at least one BWP configuration to be activated, transmit the first DCI to a UE, and communicate with the UE in accordance with the first DCI.

Certain aspects of the subject matter described in this disclosure can be implemented in an apparatus for wireless communication by a UE. The apparatus generally includes: means for receiving, from a BS, first DCI indicating whether resources are allocated for at least one data channel on multiple carriers, the first DCI configuring at least one BWP configuration to be activated on the multiple carriers, means for interpreting the first DCI based on the at least one BWP configuration to be activated, and means for communicating with the BS in accordance with the first DCI as interpreted based on the at least one BWP configuration.

Certain aspects of the subject matter described in this disclosure can be implemented in an apparatus for wireless communication by a BS. The apparatus generally includes: means for generating first DCI indicating whether resources are allocated for at least one data channel on multiple carriers, the first DCI configuring at least one BWP configuration to be activated on the multiple carriers, the first DCI being generated based on the at least one BWP configuration to be activated, means for transmitting the first DCI to a UE, and means for communicating with the UE in accordance with the first DCI.

Certain aspects of the subject matter described in this disclosure can be implemented in a computer-readable medium having instructions stored thereon to cause a UE to receive, from a BS, first DCI indicating whether resources are allocated for at least one data channel on multiple carriers, the first DCI configuring at least one BWP configuration to be activated on the multiple carriers, interpret the first DCI based on the at least one BWP configuration to be activated, and communicate with the BS in accordance with the first DCI as interpreted based on the at least one BWP configuration.

Certain aspects of the subject matter described in this disclosure can be implemented in a computer-readable medium having instructions stored thereon to cause a BS to generate first DCI indicating whether resources are allocated for at least one data channel on multiple carriers, the first DCI configuring at least one BWP configuration to be activated on the multiple carriers, the first DCI being generated based on the at least one BWP configuration to be activated, transmit the first DCI to a UE, and communicate with the UE in accordance with the first DCI.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 5 is a flow diagram illustrating example operations for wireless communication by a UE, in accordance with certain aspects of the present disclosure.

FIG. 6 is a flow diagram illustrating example operations for wireless communication by a BS, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
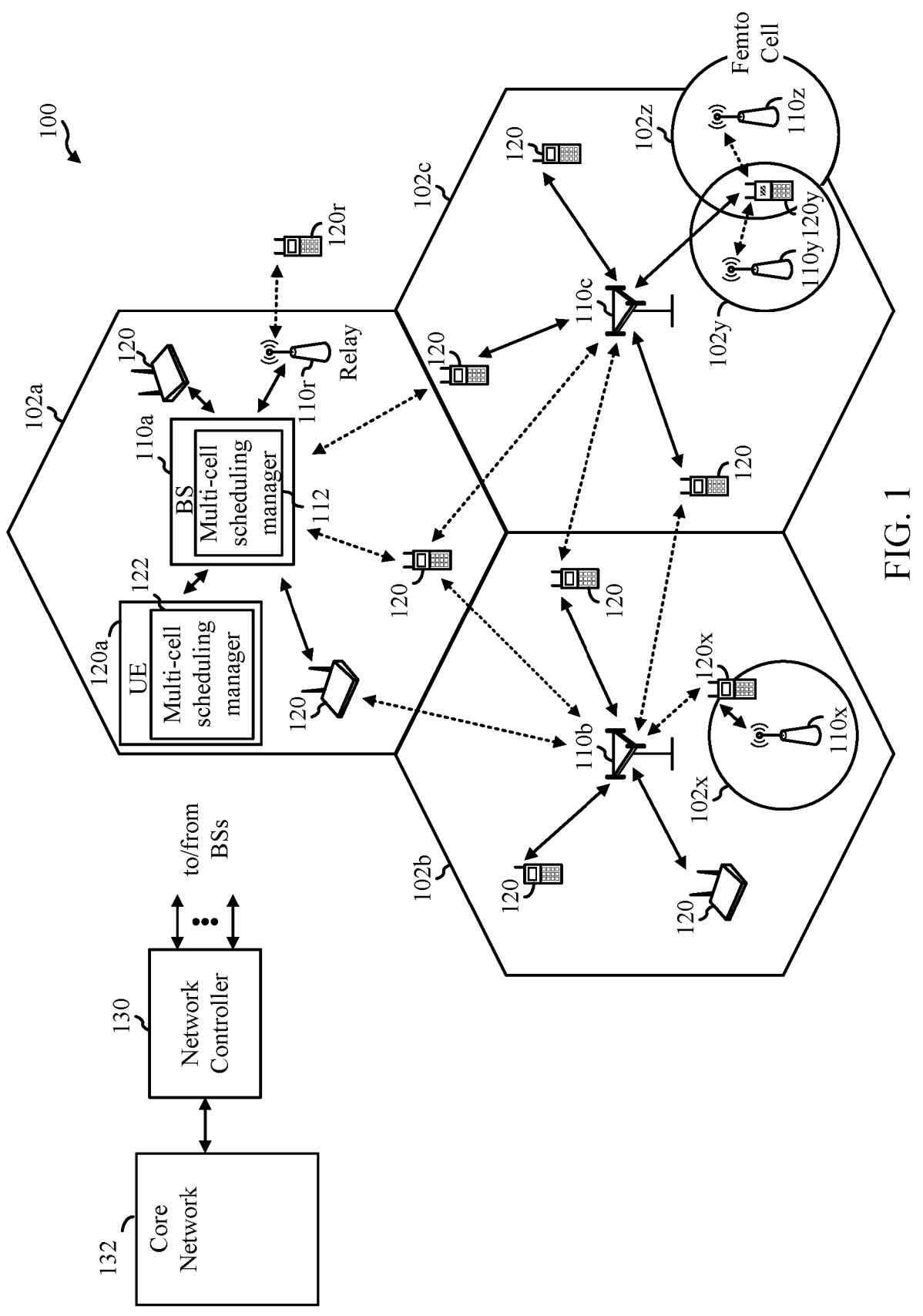
FIG. 1 is a block diagram conceptually illustrating an example wireless communication network, in accordance with certain aspects of the present disclosure.

Aspects of the present disclosure provide apparatus, methods, processing systems, and computer-readable mediums for multi-cell scheduling. For example, aspects provide enhanced techniques for bandwidth part (BWP) operations when a user equipment (UE) is configured with multi-cell physical downlink shared channel (PDSCH) or physical uplink shared channel (PUSCH) scheduling.

In particular, a downlink control information (DCI) in a physical downlink control channel (PDCCH) may be designed to schedule multiple cells for a UE. According to certain aspects described herein, the DCI may also configure the UE with one or multiple BWP configurations to perform BWP operations (e.g., BWP switching) for multi-cell scheduling.

In some aspects, the DCI (e.g., a DCI having a format for multi-cell data scheduling) indicates a null-BWP for one of two cells scheduled for a UE, which triggers the UE to switch from monitoring for a multi-cell scheduling DCI format to monitoring for a single-cell scheduling DCI format. In some cases, the DCI (e.g., a DCI having a format for single-cell data scheduling) indicates a non-null BWP for one of two cells scheduled for a UE (e.g., a cell for which a null-BWP was previously indicated), which triggers the UE to switch from monitoring for a single-cell scheduling DCI format to monitoring for a multi-cell scheduling DCI format.

In some aspects, the DCI (e.g., a DCI having a format for multi-cell data scheduling) indicates that an activated BWP spans only one of two cells scheduled for a UE, which triggers the UE to switch from monitoring for a multi-cell scheduling DCI format to monitoring for a single-cell scheduling DCI format. In some cases, the DCI (e.g., a DCI having a format for single-cell data scheduling) indicates an activated BWP spans two cells, where the two cells are scheduled for the UE, which triggers the UE to switch from monitoring for a single-cell scheduling DCI format to monitoring for a multi-cell scheduling DCI format. Indicating a change in configuration via the DCI as described lowers communication overhead as compared to conventional implementations.

The following description provides examples of multi-cell scheduling in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access (for example, 5G NR) may support various wireless communication services, such as enhanced mobile broadband (eMBB) targeting wide bandwidth (e.g., 80 megahertz (MHz) or beyond), millimeter wave (mmW) targeting high carrier frequency (e.g., 25 gigahertz (GHz) or beyond), massive machine type communications MTC (mMTC) targeting non-backward compatible MTC techniques, and/or mission critical targeting ultra-reliable low-latency communications (URLLC). These services may include latency and reliability specifications. These services may also have different transmission time intervals (TTIs) to meet respective quality of service (QoS) specifications. In addition, these services may co-exist in the same time-domain resources (for example, a slot or subframe) or frequency-domain resource (for example, a component carrier (CC)). NR supports beamforming and beam direction may be dynamically configured.

Multiple-input multiple-output (MIMO) transmissions with precoding may also be supported. MIMO configurations in the downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications Network

FIG. 1 illustrates an example wireless communication network 100 in which aspects of the present disclosure may be performed. For example, as shown in FIG. 1, wireless communication network 100 may include a user equipment (UE) 120a configured to perform operations 500 of FIG. 5 and/or a base station (BS) 110a configured to perform operations 600 of FIG. 6 to support multi-cell scheduling.

As shown in FIG. 1, BS 110a includes a multi-cell scheduling manager 112. Multi-cell scheduling manager 112 may be configured to generate downlink control information (DCI) indicating whether resources are allocated for at least one data channel on multiple carriers, the DCI configuring at least one BWP configuration to be activated on the multiple carriers, wherein the DCI is to be generated based on the at least one BWP configuration to be activated and transmitting the DCI to the UE, in accordance with certain aspects of the present disclosure. Similarly, as shown in FIG. 1, UE 120a includes multi-cell scheduling manager 122. Multi-cell scheduling manager 122 may be configured to receive from the BS, DCI indicating whether resources are allocated for at least one data channel on multiple carriers, the DCI configuring at least one BWP configuration to be activated on the multiple carriers and interpreting the first DCI based on the at least one BWP configuration to be activated, in accordance with certain aspects of the present disclosure.

Wireless communication network 100 may be a new radio (NR) system (e.g., a 5G NR network). As shown in FIG. 1, wireless communication network 100 may be in communication with a core network 132. Core network 132 may be in communication with one or more BSs 110 and/or UEs 120 in wireless communication network 100 via one or more interfaces.

Further, as illustrated in FIG. 1, wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, BSs 110a, 110b and 110c may be macro BSs for the macro cells 102a, 102b and 102c, respectively. BS 110x may be a pico BS for a pico cell 102x. The BSs 110y and 110z may be femto BSs for the femto cells 102y and 102z, respectively. ABS may support one or multiple cells. A network controller 130 may couple to a set of BSs 110 and provide coordination and control for these BSs 110. Network controller 130 may communicate with BSs 110 via a backhaul. BSs 110 may also communicate with one another (for example, directly or indirectly) via wireless or wireline backhaul.

BSs 110 communicate with UEs 120a-y (each also individually referred to herein as UE 120 or collectively as UEs 120) in wireless communication network 100. UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and send a transmission of the data and/or other information to a downstream station (e.g., a UE 120 or a BS 110), or that relay transmissions between UEs 120, to facilitate communication between devices.

Figure 2:
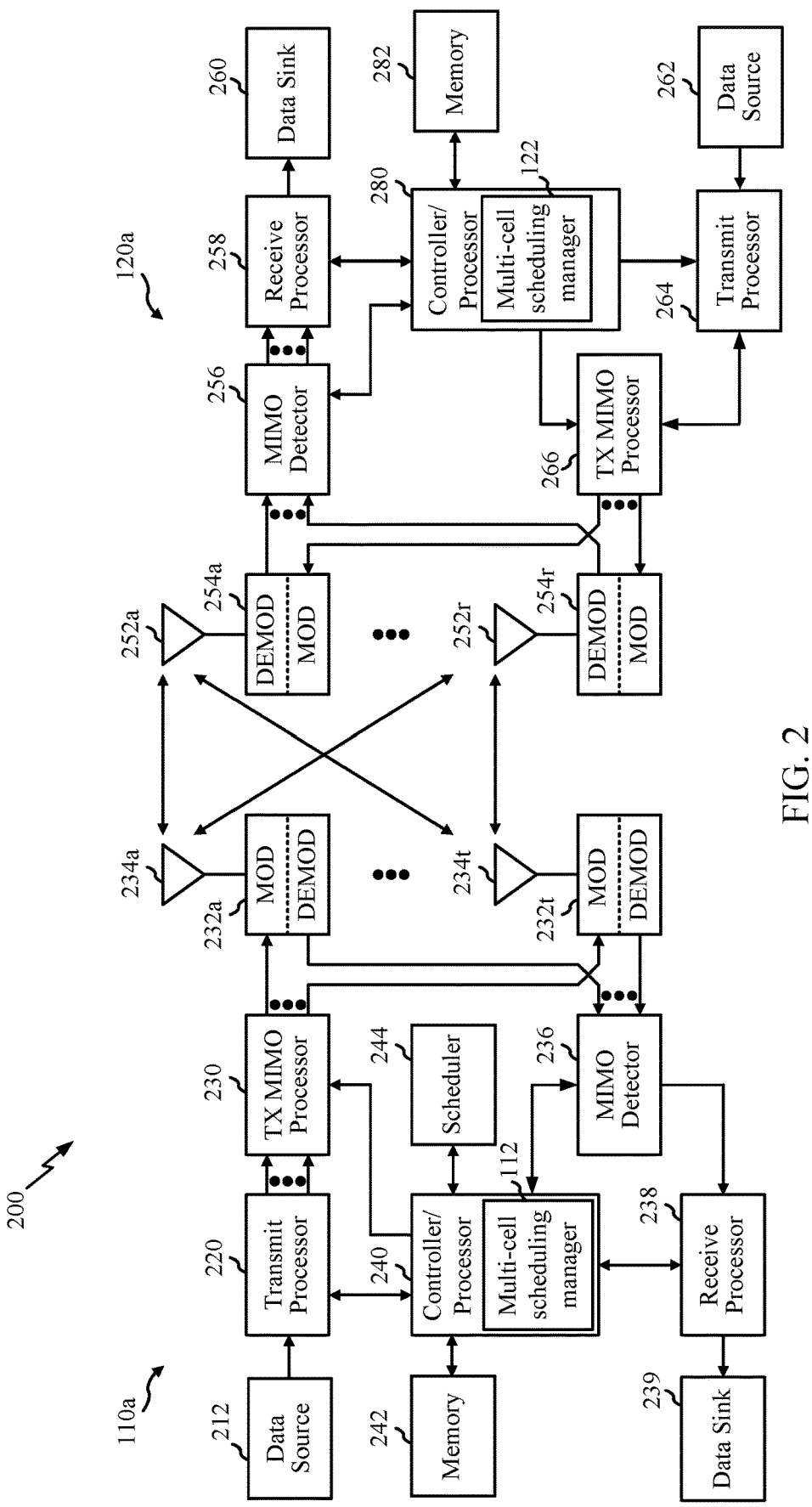
FIG. 2 is a block diagram illustrating an example base station (BS) and an example user equipment (UE), in accordance with certain aspects of the present disclosure.

FIG. 2 is a block diagram illustrating example components of BS 110a and UE 120a (e.g., in wireless communication network 100 of FIG. 1), which may be used to implement aspects of the present disclosure.

At BS 110a, a transmit processor 220 may receive data from a data source 212 and control information from a controller/processor 240. The control information may be for the physical broadcast channel (PBCH), physical control format indicator channel (PCFICH), physical hybrid automatic repeat request (HARD) indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for orthogonal frequency division multiplexing (OFDM), etc.) to obtain an output sample stream. Each modulator may further process (e.g., convert to analog, amplify, filter, and upconvert) the output sample stream to obtain a downlink (DL) signal. DL signals from modulators in transceivers 232a-232t may be transmitted via the antennas 234a-234t, respectively.

At UE 120a, antennas 252a-252r may receive the DL signals from BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for UE 120a to a data sink 260, and provide decoded control information to a controller/processor 280.

On the uplink (UL), at UE 120a, a transmit processor 264 may receive and process data (e.g., for the PUSCH) from a data source 262 and control information (e.g., for the physical uplink control channel (PUCCH) from controller/processor 280. Transmit processor 264 may also generate reference symbols for a reference signal (RS) (e.g., for the sounding reference signal (SRS)). The symbols from transmit processor 264 may be precoded by a TX MIMO processor 266 if applicable, further processed by the modulators (MODs) in transceivers 254a-254r (e.g., for single-carrier frequency division multiplexing (SC-FDM), etc.), and transmitted to BS 110a. At BS 110a, the UL signals from UE 120a may be received by antennas 234, processed by modulators in transceivers 232a-232t, detected by MIMO detector 236 if applicable, and further processed by receive processor 238 to obtain decoded data and control information sent by UE 120a. Receive processor 238 may provide the decoded data to a data sink 239 and the decoded control information to controller/processor 240.

Memories 242 and 282 may store data and program codes for BS 110a and UE 120a, respectively. A scheduler 244 may schedule UEs for data transmission on the DL and/or UL.

Antennas 252, processors 266, 258, 264, and/or controller/processor 280 of UE 120a and/or antennas 234, processors 220, 230, 238, and/or controller/processor 240 of BS 110a may be used to perform the various techniques and methods described herein. For example, as shown in FIG. 2, controller/processor 240 of BS 110a has a multi-cell scheduling manager 112 that may be configured for generating DCI indicating whether resources are allocated for at least one data channel on multiple carriers, the DCI configuring at least one BWP configuration to be activated on the multiple carriers, wherein the DCI is to be generated based on the at least one BWP configuration to be activated and transmitting the DCI to the UE, in accordance with certain aspects of the present disclosure. Similarly, as shown in FIG. 2, controller/processor 280 of UE 120a has a multi-cell scheduling manager 122 that may be configured for receiving from BS 110a, DCI indicating whether resources are allocated for at least one data channel on multiple carriers, the DCI configuring at least one BWP configuration to be activated on the multiple carriers and interpreting the first DCI based on the at least one BWP configuration to be activated, according to aspects described herein. Although shown at the controller/processor, other components of UE 120a and BS 110a may be used to perform the operations described herein.

NR may utilize OFDM with a cyclic prefix (CP) on the UL and DL. NR may support half-duplex operation using time division duplexing (TDD). OFDM and SC-FDM partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 kilohertz (KHz) and other SCS may be defined with respect to the base SCS (e.g., 30 kHz, 60 kHz, 120 kHz, 240 kHz, etc.).

Figure 3:
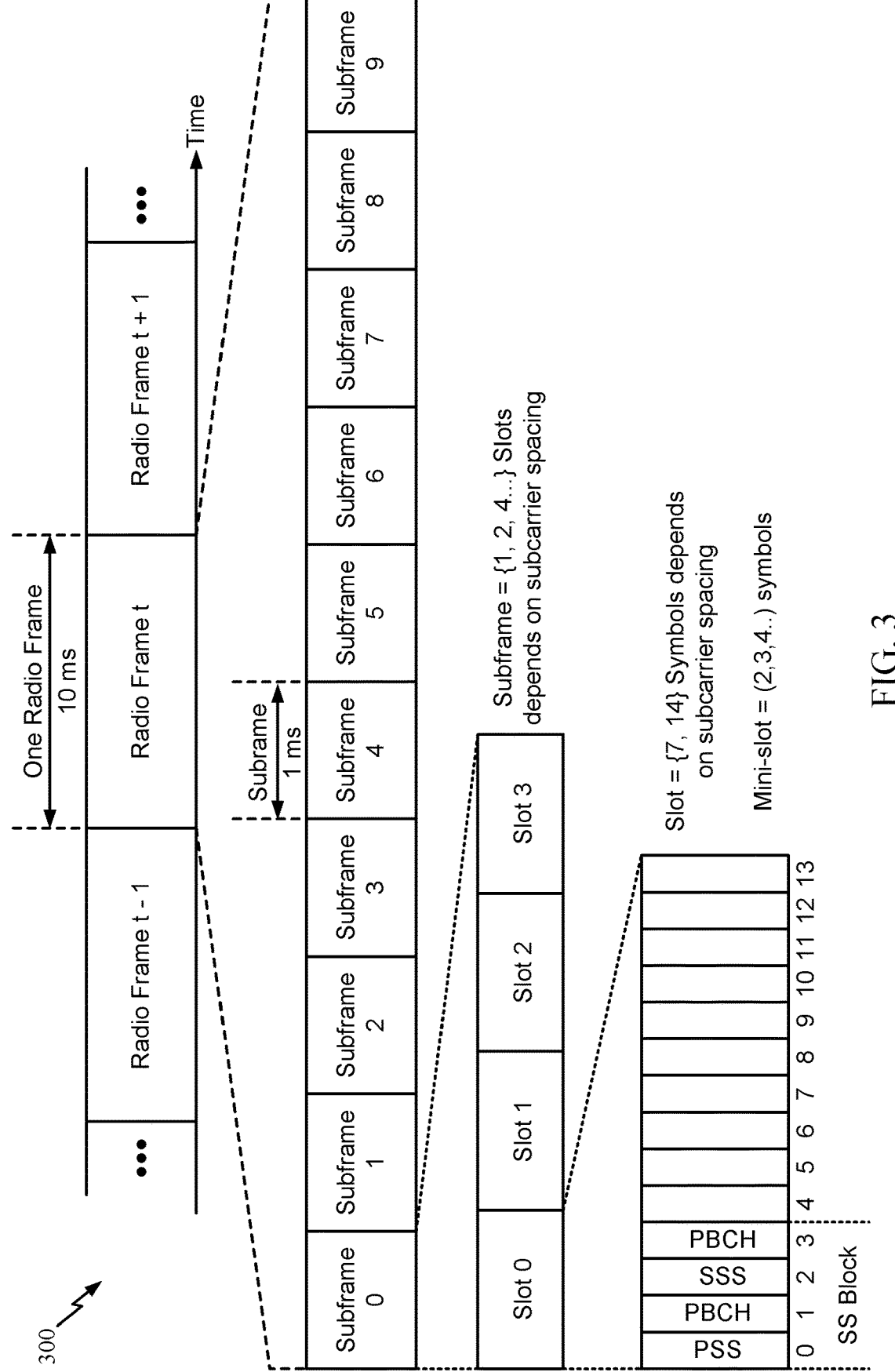
FIG. 3 is an example frame format for new radio (NR), in accordance with certain aspects of the present disclosure.

FIG. 3 is a diagram showing an example of a frame format 300 for certain wireless communication networks (e.g., NR), in accordance with certain aspects of the present disclosure. The transmission timeline for each of the DL and UL may be partitioned into units of radio frames. Each radio frame may have a predetermined duration (e.g., 10 milliseconds (ms)) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval (TTI) having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Dynamic spectrum sharing (DSS) allows an existing LTE carrier to operate 5G NR and LTE simultaneously. DSS may be based on intelligent scheduler algorithms that enable performance improvements as the mix of 4G and 5G devices in the network changes over time.

DSS enables a first carrier, such as an NR carrier, and a second carrier, such as a DSS carrier, to be deployed in a DSS arrangement for DL (or UL) communications. In the DSS arrangement, resource sharing between the NR and DSS carriers is based on time division multiplexing (TDM) and frequency division multiplexing (FDM) modes.

Downlink control information (DCI), carried by the physical downlink control channel (PDCCH), carries control information used to schedule user data, e.g., PDSCH on the DL and physical uplink shared channel (PUSCH) on the UL. The DCI indicates the location in time and frequency of the data that is scheduled for transmission, the modulation and coding schemes (MCSs) used, the number of antenna ports or layers, as well as other aspects such as hybrid automatic repeat request (HARD). A UE receiving the DCI may decode the DCI before it is able to decode DL data or transmit UL data.

In a DSS arrangement, the DCI format may be designed to schedule multiple cells. In some aspects, one DCI format in a PDCCH of a cell may schedule two PDSCHs on two scheduled cells. In some aspects, one DCI format in a PDCCH of a cell may schedule one PDSCH over two scheduled cells.

Figure 4A:
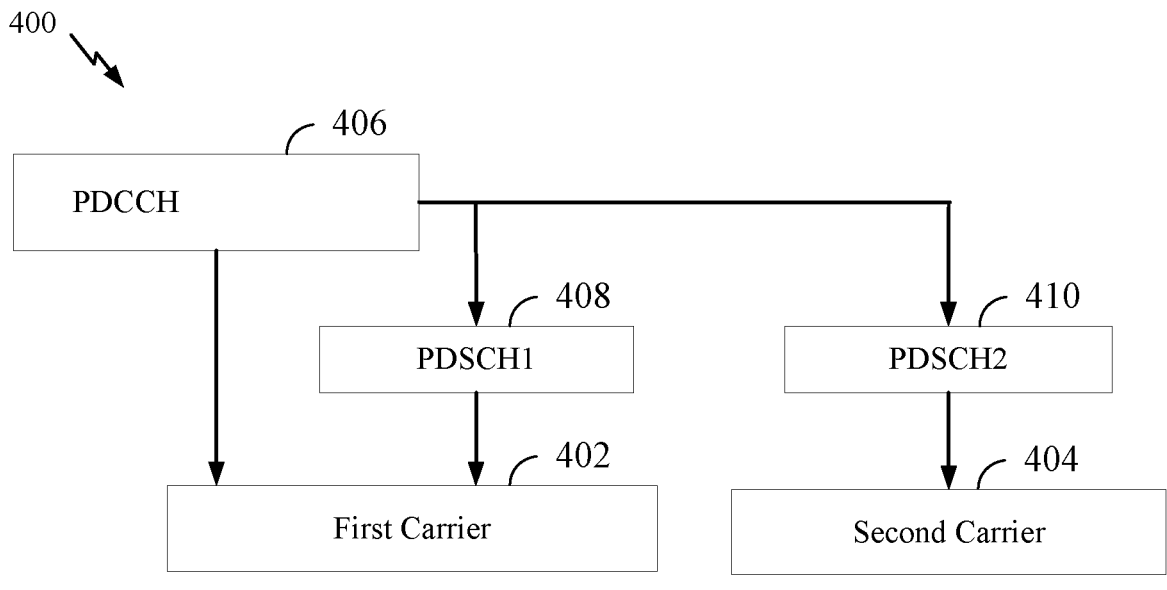
FIGS. 4A and 4B illustrate example scheduling options for multiple cells in a dynamic spectrum sharing (DSS) arrangement, in accordance with certain aspects of the present disclosure.
Figure 4B:
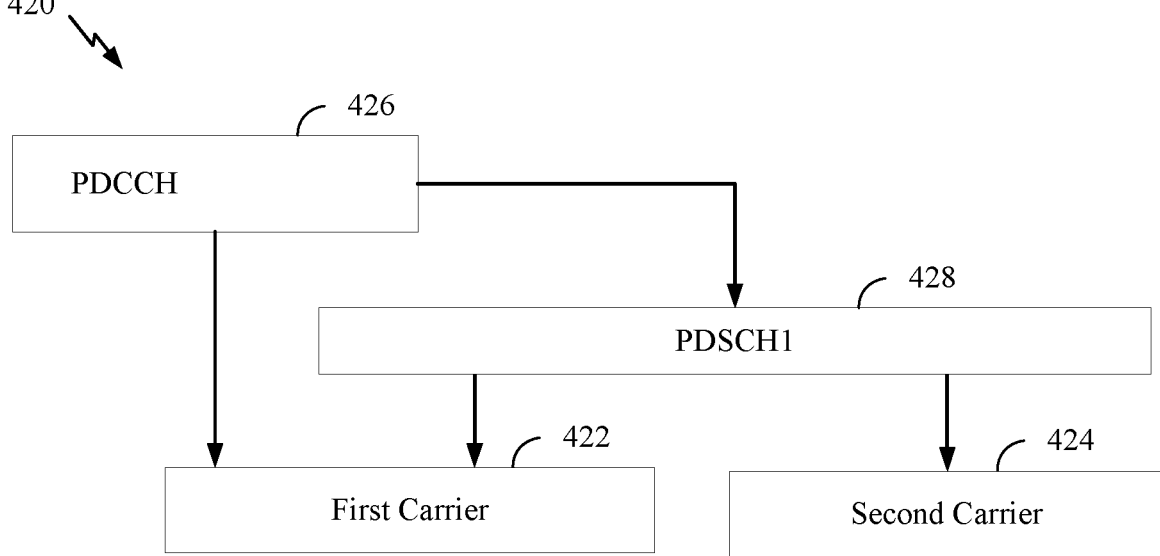

FIGS. 4A and 4B illustrate scheduling options for multiple cells in a DSS arrangement 400, in accordance with certain aspects of the present disclosure. As shown in FIG. 4A, DSS arrangement 400 illustrates deployment of a first cell operating in a first carrier 402 on the same frequency band as a second cell operating in a second carrier 404. In some cases, first carrier 402 and second carrier 404 are NR only carriers. In some cases, first carrier 402 and second carrier 404 are DSS carriers. In some cases, one of the first carrier 402 or the second carrier 404 is an NR only carrier and the other carrier is a DSS carrier.

DSS arrangement 400 uses a scheduling option where one DCI format in a a PDCCH 406 is used to schedule a PDSCH 408 for the cell operating in the first carrier 402 and the PDSCH 410 for the cell operating in the second carrier 404.

Similar to FIG. 4A, as shown in FIG. 4B, DSS arrangement 420 illustrates deployment of a cell operating a first carrier 422 on the same frequency band as a cell operating in a second carrier 424. In some cases, first carrier 422 and second carrier 424 are NR only carriers. In some cases, first carrier 422 and second carrier 424 are DSS carriers. In some cases, one of the first carrier 422 or the second carrier 424 is an NR only carrier and the other carrier is a DSS carrier.

DSS arrangement 420 uses a scheduling option where one DCI format in a PDCCH 426 is used to schedule one PDSCH 428 for both the scheduled cell operating in the first carrier 402 and the scheduled cell operating in the second carrier 404.

Multi-cell PDSCH scheduling may be considered for a multitude of UE configurations. In some aspects, multi-cell PDSCH scheduling may be designed for a UE configured with inter-band carrier aggregation (CA), where a primary cell (Pcell) and secondary cell (Scell) are aggregated for the UE. The PCell for the UE operates on a DSS carrier (e.g., same carrier is also used for serving LTE users). In some examples, the SCS for the Pcell and Scell may be different. In some examples, the SCS for the Pcell and Scell may be the same. In some examples, the intra-band CA may involve multiple serving cells having the same SCS (with all cells operating on non-DSS carriers). In some examples, the intra-band CA may involve a Pcell and multiple Scells (with at least the Scells operating on non-DSS carriers).

Although multiple BWPs may be defined in DL and UL transmissions, only one BWP may be active at one time per cell in some implementations. A mechanism is used to select and switch from one active BWP to another active BWP. For example, BWP selection (or BWP switching) may be accomplished via radio resource control (RRC) signaling, via the MAC entity itself upon the initiation of a random access procedure, via a BWP inactivity timer, or via the DCI in a PDCCH. BWP switching via RRC signaling enables the RRC to (re)configure the BWP. BWP switching via a BWP inactivity timer triggers BWP switching when the timer expires. For example, if there is no traffic for a specific duration of time, then the BWP is switched to a default BWP. BWP switching via the PDCCH (e.g., DCI) enables BWP switching by a BWP indicator field in a DCI indicating a specific BWP to be activated. For example, a UE can be configured with multiple BWP configurations. If BWP switching is indicated by the BWP indicator field, then the UE may interpret fields (e.g., BWP indicator field) of the DCI based on the newly active BWP configuration. The DCI may have a DCI format that is based on the currently active BWP configuration.

Certain aspects provide techniques for BWP switching for a UE configured with multi-cell PDSCH or PUSCH scheduling. More specifically, the present disclosure provides techniques for BWP switching in a DSS arrangement, where a DCI format in a PDCCH of a cell may be used to schedule multiple cells.

Example Bandwidth Part (BWP) Operations for Multi-Cell Scheduling

Certain aspects of the present disclosure provide apparatus, methods, processing systems, and computer-readable mediums for multi-cell scheduling. For example, certain aspects provide techniques for bandwidth part (BWP) operations (e.g., BWP switching) when a UE is configured with multi-cell physical downlink shared channel (PDSCH) or physical uplink shared channel (PUSCH) scheduling.

As mentioned above, a downlink control information (DCI) format may be designed to schedule multiple cells (also referred to herein as "carriers" or "component carriers (CCs)"). In some aspects, one DCI format in a physical downlink control channel (PDCCH) of a cell may schedule two PDSCHs on two scheduled cells. In some aspects, one DCI format in a PDCCH of a cell may schedule one PDSCH over two scheduled cells.

A user equipment (UE) may receive, from a base station (BS), a DCI indicating that resources for the data channel (e.g., a PUSCH or a PDSCH) are allocated on multiple cells. The received DCI may also configure the UE with one or multiple BWP configurations per cell. To perform BWP operations (e.g., BWP switching) in multi-cell scheduling, the BWP may be configured per cell or the BWP may be configured for a set of cells. In some examples, where the BWP is configured per cell, a separate BWP indication field may be included in a DCI format for each cell. In some examples, where the BWP is configured per cell, a joint BWP indication field may be included in a DCI format for the set of cells. In some examples, where the BWP is configured for a set of cells, a BWP indication field for the BWP across the cells may be included in a DCI format, as described in more detail herein.

FIG. 5 is a flow diagram illustrating example operations 500 for wireless communication by a UE, in accordance with certain aspects of the present disclosure. Operations 500 may be performed, for example, by UE 120a in wireless communication network 100.

Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 500 may begin, at block 505, by the UE, receiving, from a BS, a first DCI indicating whether resources are allocated for at least one data channel on multiple carriers, the first DCI configuring at least one BWP configuration to be activated on the multiple carriers. At block 510, the UE interprets the first DCI based on the at least one BWP configuration to be activated. At block 515, the UE communicates with the BS in accordance with the first DCI as interpreted based on the at least one BWP configuration.

FIG. 6 is a flow diagram illustrating example operations 600 for wireless communication by a BS, in accordance with certain aspects of the present disclosure. Operations 600 may be performed, for example, by BS 110a in wireless communication network 100. Operations 600 may be complementary operations by the BS to operations 500 performed by the UE.

Operations 600 may be implemented as software components that are executed and run on one or more processors (e.g., controller/processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

Operations 600 may begin, at block 605, by the BS generating a first DCI indicating whether resources are allocated for a data channel on multiple carriers, the first DCI configuring at least one BWP configuration to be activated on the multiple carriers, the first DCI being generated based on the at least one BWP configuration to be activated. At block 610, the BS transmits the first DCI to a UE. At block 615, the BS communicates with the UE in accordance with the first DCI.

In some aspects, the BWP configuration may be per cell when a UE is configured with multi-cell PDSCH/PUSCH scheduling by one DCI format. For example, the BWP configuration received by the UE may include a first BWP configuration for a first cell and a second BWP configuration for a second cell when the UE is configured with PDSCH/PUSCH scheduling for two cells.

In some aspects where the BWP is configured per cell, a separate BWP indication field may be included in a DCI format for each cell. For example, two BWP indication fields may be included (and indicate BWP switching independently) when the UE is configured for multi-cell scheduling of two cells.

In some aspects, where the BWP is configured per cell, a joint BWP indication field may be included in a DCI format for the set of cells. For example, one BWP indication field may be included when the UE is configured for multi-cell scheduling of two cells. The single BWP indication field may indicate BWP switching for a pair of (e.g., a BWP for a first CC (CC1) and a BWP for a second CC (CC2)) jointly. For example, the BWP indication field may jointly indicate the BWP configuration to be activated for the first cell and the BWP configuration to be activated for the second cell.

If BWP switching is indicated for a cell, then the DCI fields for the cell may be interpreted based on the newly activated BWP. More specifically, fields of the DCI for a first cell may be interpreted based on the newly activated BWP configuration for the first cell, while fields of the DCI for a second cell may be interpreted based on the newly activated BWP configuration for the second cell.

In some aspects, the BWP indicator field may include an indication of a null-BWP for one of the cells. A BWP indication field which includes a null-BWP may signal that a BWP is not scheduled for that cell, there is no data assignment on that BWP, or the BWP is dormant and no PDSCH or PUSCH is scheduled. The indication of a null-BWP for a cell may trigger the UE to switch from monitoring a multi-cell scheduling DCI format (e.g., where the UE is configured for multi-carrier data channel scheduling) to monitoring a single-cell scheduling (e.g., where the UE is configured for single-carrier data channel scheduling) DCI format.

Figure 7:
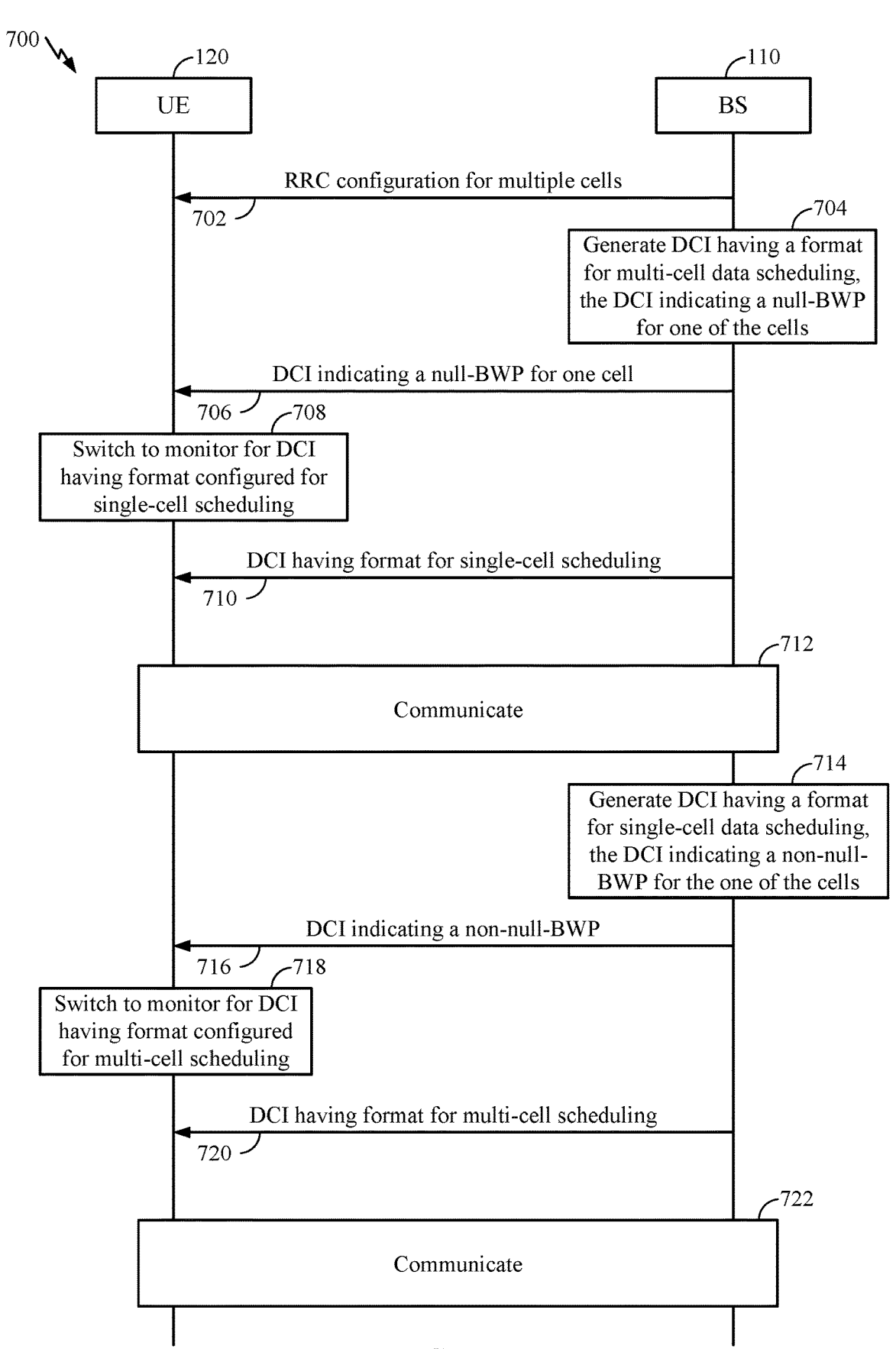
FIG. 7 is a call flow diagram illustrating bandwidth part (BWP) operations for multi-cell scheduling using a BWP indicator field for a BWP configuration per cell, in accordance with certain aspects of the present disclosure.

FIG. 7 is a call flow diagram 700 illustrating example BWP operations for multi-cell scheduling using a BWP indicator field per cell, in accordance with certain aspects of the present disclosure. As shown in the example of FIG. 7, a UE 120 may receive from a BS 110 a configuration 702 (e.g., radio resource control (RRC) configuration) for multiple cells. At block 704, BS 110 may generate DCI 706 indicating that resources are allocated for a data channel (e.g., PDSCH/PUSCH) on multiple cells. Thus, DCI 706 may have a format configured for multi-cell data channel scheduling. DCI 706 may further indicate a null-BWP for one of the cells. In multi-cell scheduling (e.g., PDSCH/PUSCH scheduling two cells), a particular value of the BWP indication field may be configured by RRC to be a null-BWP indication for one of the cells. When a null-BWP is indicated for a cell, the UE 120 may determine not to use that cell and may interpret the fields of DCI based on a configuration for single-cell data channel scheduling. For example, the UE may prepend zeros to an information field of the DCI (e.g., the BWP indication field) until the size of the information field is the one appropriate for the interpretation of the information field.

The UE 120 may receive DCI 706 sent from BS 110. At block 708, UE 120 may switch to monitor for a DCI having a format configured for single-cell data channel scheduling. For example, UE 120 may receive DCI 710 sent from BS 110. DCI 710 may have a format configured for single-cell data channel scheduling. At block 712, UE 120 may communicate with BS 110 using DCI 710.

At block 714, BS 110 may generate DCI 716 having a format configured for single-cell data channel scheduling. DCI 716 may further indicate a non-null-BWP for the one of the cells (the cell for which a null-BWP was indicated via DCI 706).

UE 120 may receive DCI 716 sent from BS 110. At block 718, UE 120 may switch to monitor for DCI having a format configured for multi-cell data channel scheduling in response to the reception of the indication of the non-null-BWP. For example, UE 120 may receive DCI 720 sent from BS 110. DCI 720 may have a format configured for multi-cell data channel scheduling. At block 722, UE 120 may communicate with BS 110 using DCI 720.

In some aspects, the BWP configuration may be for a set of cells when a UE is configured with multi-cell PDSCH/PUSCH scheduling by one DCI format. For example, the BWP configuration may include a single BWP configuration for both a first cell and a second cell when the UE is configured with PDSCH/PUSCH scheduling for two cells. Accordingly, the DCI received by the UE may include a BWP indication field indicating this BWP configuration which is to be to be activated on the first cell and the second cell.

Figure 8:
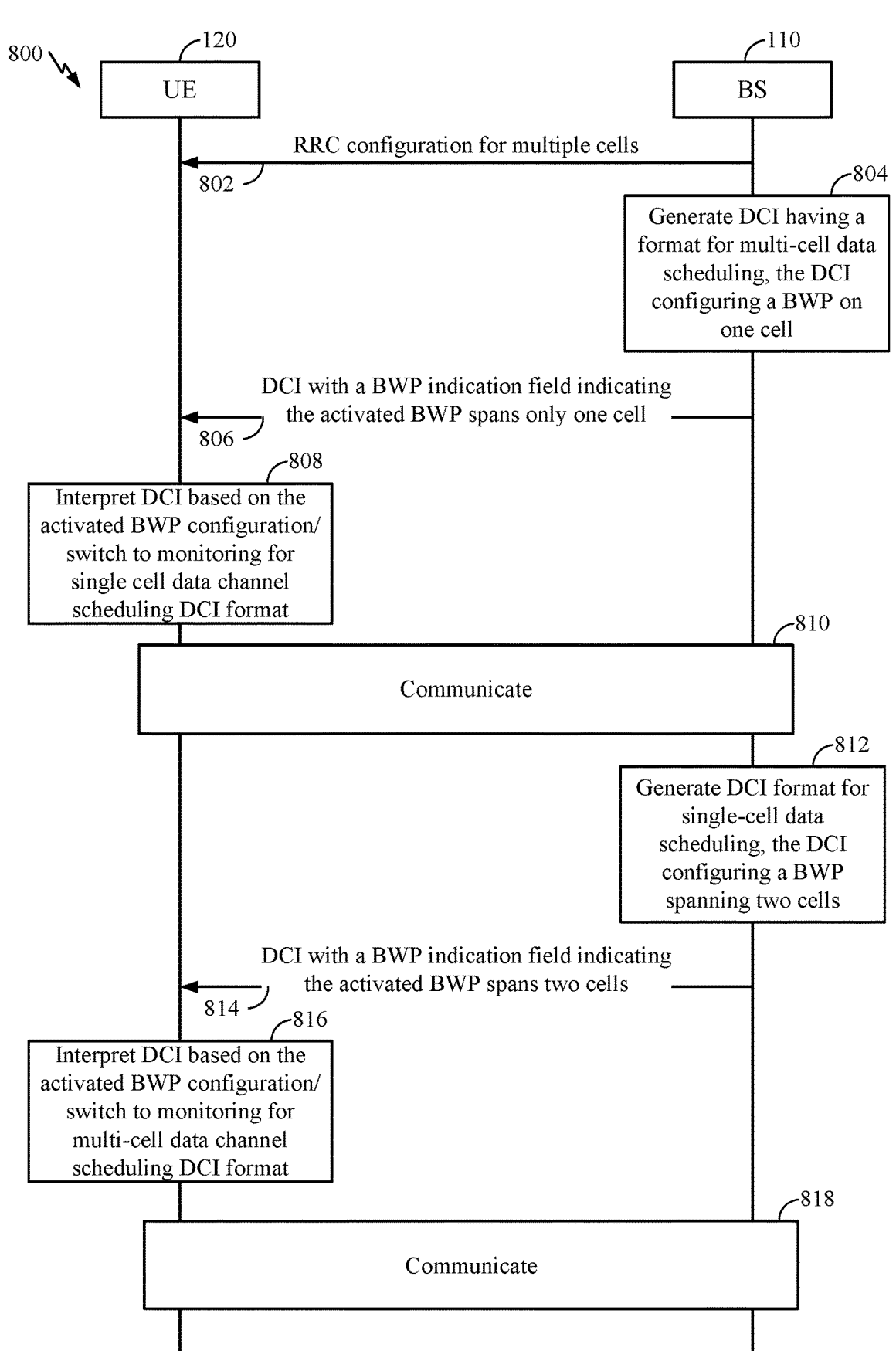
FIG. 8 is a call flow diagram illustrating BWP operations for multi-cell scheduling using a BWP indicator field for a BWP configuration for multiple cells, in accordance with certain aspects of the present disclosure.

FIG. 8 is a call flow diagram 800 illustrating example BWP operations for multi-cell scheduling using a BWP indicator field across the cells, in accordance with certain aspects of the present disclosure. As shown in the example of FIG. 8, a UE 120 may receive from a BS 110 a configuration 802 (e.g., RRC configuration) for multiple cells. At block 804, BS 110 may generate DCI 806 having a format configured for multi-cell data channel scheduling. DCI 806 may further configure a BWP on only one cell.

UE 120 may receive, from BS 110, DCI 806 (e.g., DCI having a format for multi-cell data scheduling) with a BWP indication field indicating the activated BWP spans only one cell. At block 808, UE 120 may interpret DCI fields of the DCI format based on the activated BWP configuration (e.g., indicating that the activated BWP spans only one cell). UE 120 may switch from monitoring a DCI having multi-cell data scheduling to monitoring a DCI having single-cell data scheduling (e.g., switch to monitor a DCI format scheduling PDSCH/PUSCH only on the cell for which the activated BWP spans). At block 810, UE 120 may communicate with the BS 110 based on DCI 806.

At block 812, BS 110 may generate another DCI 814 having a format for single-cell data channel scheduling. DCI 814 may further configure a BWP that spans across two cells.

UE 120 may receive, from BS 110, DCI 814 (e.g., DCI having a format for single-cell data scheduling) with a BWP indication field indicating the activated BWP spans across two cells. At block 816, UE 120 may interpret DCI fields of the DCI format based on the activated BWP configuration. If the activated BWP spans across two cells, UE 120 may determine to switch back to monitoring a DCI format configured for scheduling PDSCH/PUSCH on both of the cells. At block 818, UE 120 may communicate with the BS 110 based on the DCI 814.

Example Wireless Communications Devices

Figure 9:
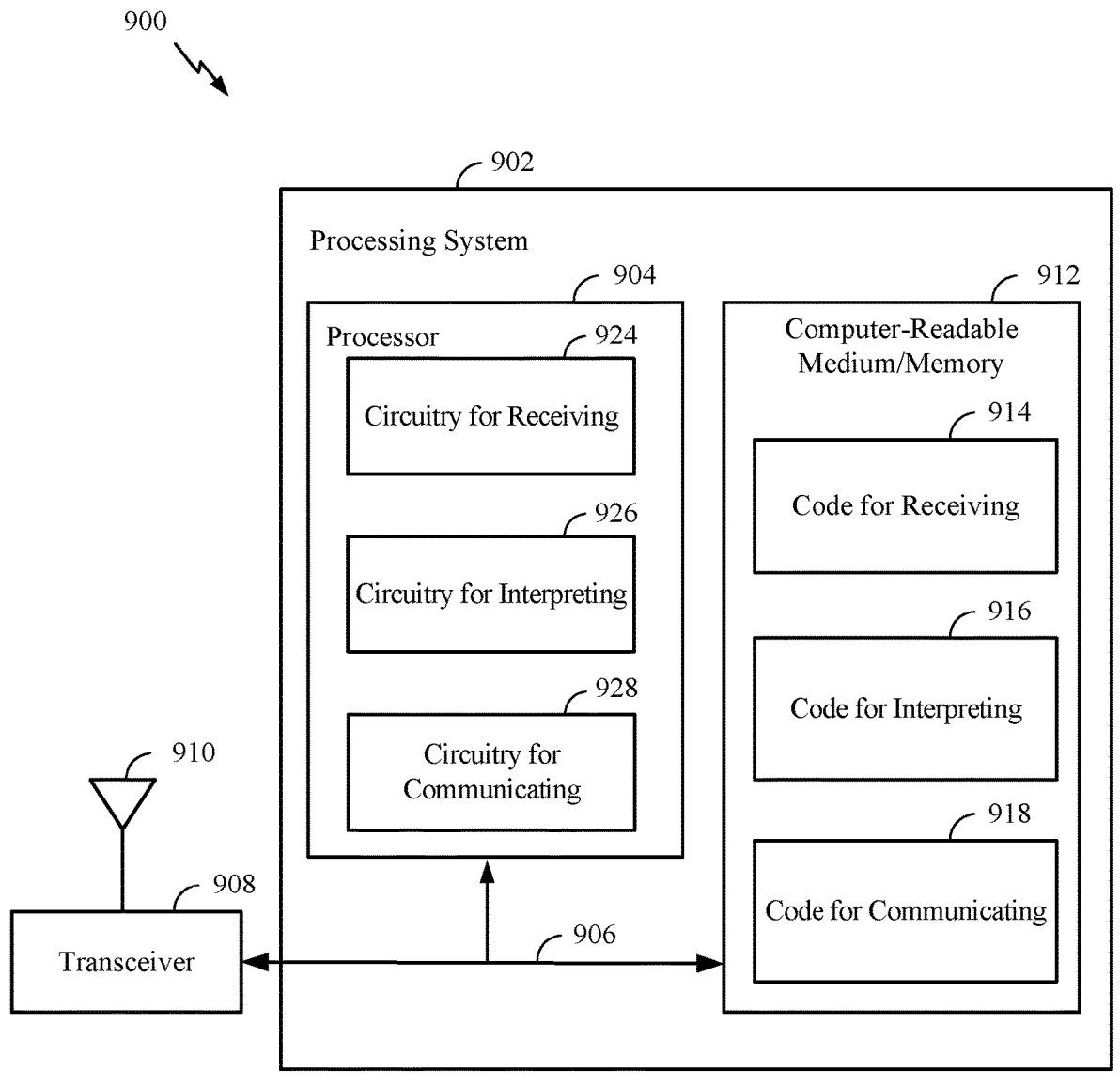
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) operable, configured, or adapted to perform operations for the techniques disclosed herein, such as the operations illustrated in FIG. 5. In some examples, communications device 900 may be a user equipment (UE), such as UE 120a described with respect to FIGS. 1 and 2.

Communications device 900 includes a processing system 902 coupled to a transceiver 908 (e.g., a transmitter and/or a receiver). Transceiver 908 is configured to transmit and receive signals for the communications device 900 via an antenna 910, such as the various signals as described herein. Processing system 902 may be configured to perform processing functions for communications device 900, including processing signals received and/or to be transmitted by communications device 900.

Processing system 902 includes a processor 904 coupled to a computer-readable medium/memory 912 via a bus 906. In certain aspects, computer-readable medium/memory 912 is configured to store instructions (e.g., computer-executable code) that when executed by processor 904, cause processor 904 to perform the operations illustrated in FIG. 5, or other operations for performing the various techniques discussed herein for multi-cell scheduling.

In certain aspects, computer-readable medium/memory 912 stores code 914 (an example means for) for receiving (e.g., for receiving, from a base station (BS), first downlink control information (DCI) indicating whether resources are allocated for at least one data channel on multiple carriers, the first DCI configuring at least one bandwidth part (BWP) configuration to be activated on the multiple carriers); code 916 (an example means for) for interpreting (e.g., for interpreting the first DCI based on the at least one BWP configuration to be activated); and code 918 (an example means for) for communicating (e.g., for communicating with the BS in accordance with the first DCI as interpreted based on the at least one BWP configuration).

In certain aspects, processor 904 has circuitry configured to implement the code stored in computer-readable medium/memory 912. Processor 904 includes circuitry 924 (an example means for) for receiving (e.g., for receiving, from a BS, first DCI indicating whether resources are allocated for at least one data channel on multiple carriers, the first DCI configuring at least one BWP configuration to be activated on the multiple carriers); circuitry 926 (an example means for) for interpreting (e.g., for interpreting the first DCI based on the at least one BWP configuration to be activated); and circuitry 928 (an example means for) for communicating (e.g., for communicating with the BS in accordance with the first DCI as interpreted based on the at least one BWP configuration).

In some cases, the operations illustrated in FIG. 5, as well as other operations described herein, may be implemented by one or more means-plus-function components. For example, in some cases, such operations may be implemented by means for receiving, means for interpreting, and means for communicating.

In some cases, means for interpreting includes a processing system, which may include one or more processors, such as receive processor 258, transmit processor 264, TX MIMO processor 266, and/or controller/processor 280 of UE 120a illustrated in FIG. 2 and/or processing system 902 of communications device 900 in FIG. 9.

Means for communicating may include means for receiving and means for transmitting. Means for receiving or means for obtaining may include a receiver (such as receive processor 258) or antenna(s) 252 of UE 120a illustrated in FIG. 2. Means for transmitting or means for outputting may include a transmitter (such as transmit processor 264) or antenna(s) 252 of UE 120a illustrated in FIG. 2.

Transceiver 908 may provide a means for receiving or transmitting information. Information may be received other components of communications device 900. Antenna 910 may correspond to a single antenna or a set of antennas. Transceiver 908 may provide means for transmitting signals generated by other components of communications device 900.

Notably, FIG. 9 is just use one example, and many other examples and configurations of communications device 900 are possible.

Figure 10:
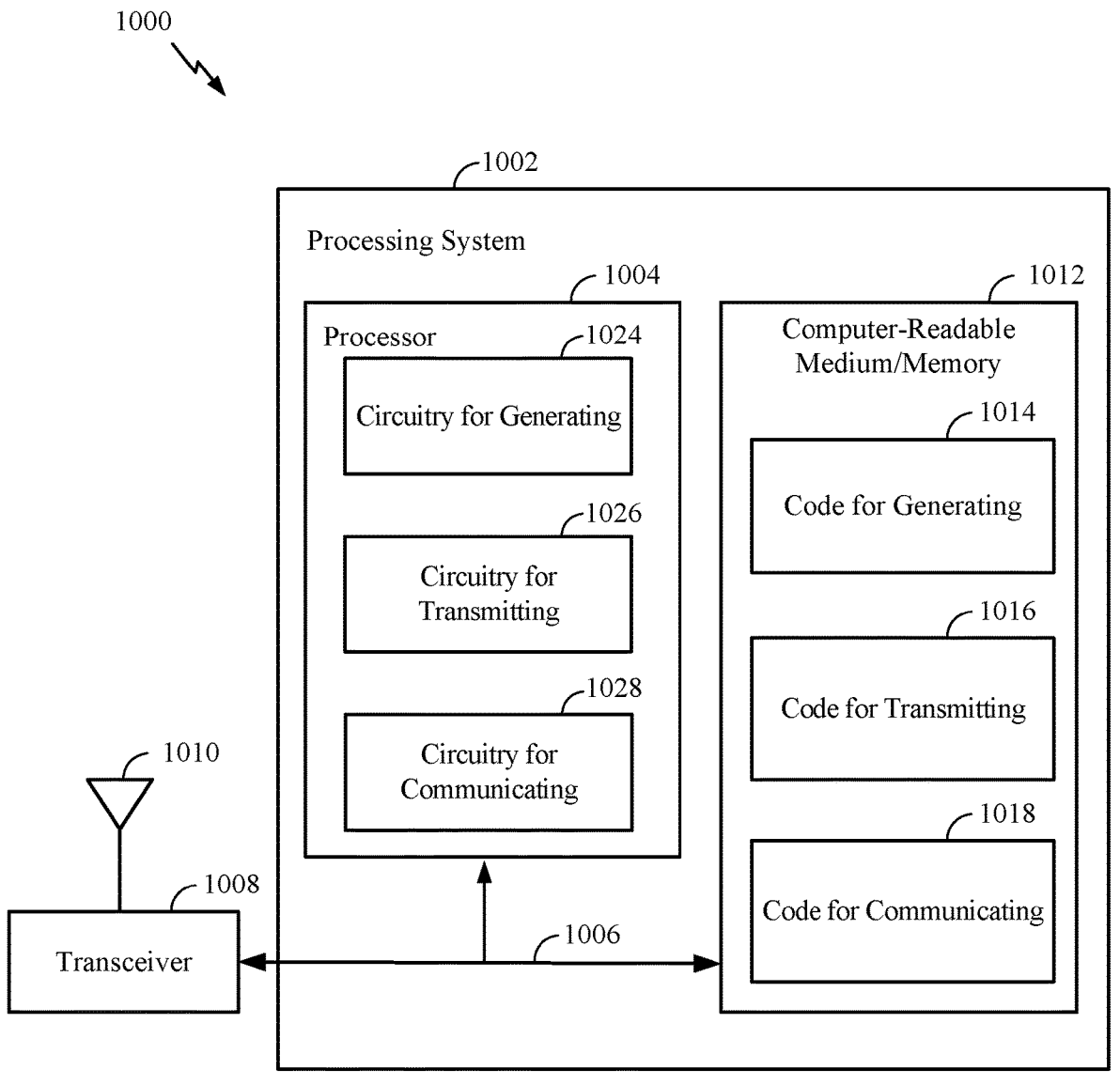
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) operable, configured, or adapted to perform operations for the techniques disclosed herein, such as the operations illustrated in FIG. 6. In some examples, communications device 1000 may be a BS, such as BS 110a described with respect to FIGS. 1 and 2.

Communications device 1000 includes a processing system 1002 coupled to a transceiver 1008 (e.g., a transmitter and/or a receiver). Transceiver 1008 is configured to transmit and receive signals for communications device 1000 via an antenna 1010, such as the various signals as described herein. Processing system 1002 may be configured to perform processing functions for the communications device 1000, including processing signals received and/or to be transmitted by communications device 1000.

Processing system 1002 includes a processor 1004 coupled to a computer-readable medium/memory 1012 via a bus 1006. In certain aspects, computer-readable medium/memory 1012 is configured to store instructions (e.g., computer-executable code) that when executed by processor 1004, cause processor 1004 to perform the operations illustrated in FIG. 6, or other operations for performing the various techniques discussed herein for multi-cell scheduling. In certain aspects, computer-readable medium/memory 1012 stores code 1014 (an example means for) for generating (e.g., for generating a first DCI indicating whether resources are allocated for at least one data channel on multiple carriers, the first DCI configuring at least one BWP configuration to be activated on the multiple carriers, wherein the first DCI is to be generated based on the at least one BWP configuration to be activated); code 1016 (an example means for) for transmitting (e.g., for transmitting the first DCI to a UE); and code 1018 (an example means for) for communicating (e.g., for communicating with the UE in accordance with the first DCI).

In certain aspects, processor 1004 has circuitry configured to implement the code stored in computer-readable medium/memory 1012. Processor 1004 includes circuitry 1024 (an example means for) for generating (e.g., for generating first DCI indicating whether resources are allocated for at least one data channel on multiple carriers, the first DCI configuring at least one BWP configuration to be activated on the multiple carriers, wherein the first DCI is to be generated based on the at least one BWP configuration to be activated); circuitry 1026 (an example means for) for transmitting (e.g., for transmitting the first DCI to a UE); and circuitry 1028 (an example means for) for communicating (e.g., for communicating with the UE in accordance with the first DCI).

In some cases, the operations illustrated in FIG. 6, as well as other operations described herein, may be implemented by one or more means-plus-function components. For example, in some cases, such operations may be implemented by means for generating, means for transmitting, and means for communicating.

In some cases, means for generating includes a processing system, which may include one or more processors, such as receive processor 238, transmit processor 220, TX MIMO processor 230, and/or controller/processor 240 of BS 110a illustrated in FIG. 2 and/or processing system 1002 of communications device 1000 in FIG. 10.

Means for communicating may include means for receiving and means for transmitting. Means for receiving or means for obtaining may include a receiver (such as receive processor 238) or antenna(s) 234 of BS 110a illustrated in FIG. 2. Means for transmitting or means for outputting may include a transmitter (such as transmit processor 220) or antenna(s) 234 of BS 110a illustrated in FIG. 2.

Transceiver 1008 may provide a means for receiving or transmitting information. Information may be passed on to other components of communications device 1000. Antenna 1010 may correspond to a single antenna or a set of antennas. Transceiver 1008 may provide means for transmitting signals generated by other components of communications device 1000.

Notably, FIG. 10 is just use one example, and many other examples and configurations of communications device 1000 are possible.

Multi-cell scheduling manager 122 and multi-cell scheduling manager 112 may support wireless communication in accordance with examples as disclosed herein.

Multi-cell scheduling manager 122 and multi-cell scheduling manager 112 may be an example of means for performing various aspects described herein. Multi-cell scheduling manager 122 and multi-cell scheduling manager 112, or its sub-components, may be implemented in hardware (e.g., in uplink (UL) resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, Multi-cell scheduling manager 122 and multi-cell scheduling manager 112, or its sub-components, may be implemented in code (e.g., as configuration management software or firmware) executed by a processor, or any combination thereof. If implemented in code executed by a processor, the functions of Multi-cell scheduling manager 122 and multi-cell scheduling manager 112, or its sub-components may be executed by a general-purpose processor, a DSP, an ASIC, a FPGA or other programmable logic device.

In some examples, Multi-cell scheduling manager 122 and multi-cell scheduling manager 112 may be configured to perform various operations (e.g., receiving, determining, transmitting/sending) using or otherwise in cooperation with the transceiver 908 or 1008.

Multi-cell scheduling manager 122 and multi-cell scheduling manager 112, or its sub-components, may be physically located at various positions, including being distributed such that portions of functions are implemented at different physical locations by one or more physical components. In some examples, Multi-cell scheduling manager 122 and multi-cell scheduling manager 112, or its sub-components, may be a separate and distinct component in accordance with various aspects of the present disclosure. In some examples, Multi-cell scheduling manager 122 and multi-cell scheduling manager 112, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

EXAMPLE ASPECTS

Implementation examples are described in the following numbered aspects:

Aspect 1: A method for wireless communication by a user equipment (UE), comprising receiving, from a base station (BS), first downlink control information (DCI) indicating whether resources are allocated for at least one data channel on multiple carriers, the first DCI configuring at least one bandwidth part (BWP) configuration to be activated on the multiple carriers, interpreting the first DCI based on the at least one BWP configuration to be activated, and communicating with the BS in accordance with the first DCI as interpreted based on the at least one BWP configuration.

Aspect 2: The method of Aspect 1, further comprising receiving a configuration for multi-carrier data scheduling, wherein the first DCI has a first DCI format configured for multi-carrier data channel scheduling in accordance with the configuration for the multi-carrier data scheduling.

Aspect 3: The method of Aspect 1 or 2, wherein the data channel comprises a physical uplink shared channel (PUSCH).

Aspect 4: The method of any of Aspects 1-3, wherein the data channel comprises a physical downlink shared channel (PDSCH).

Aspect 5: The method of any of Aspects 1-4, wherein the at least one BWP configuration comprises at least one first BWP configuration for a first carrier of the multiple carriers; and at least one second BWP configuration for a second carrier of the multiple carriers.

Aspect 6: The method of Aspect 5, wherein the first DCI comprises a first BWP indication field indicating the least one first BWP configuration to be activated for the first carrier and a second BWP indication field indicating the least one second BWP configuration to be activated for the second carrier.

Aspect 7: The method of Aspect 6, wherein one or more fields of the first DCI for the first carrier are interpreted based on the least one first BWP configuration to be activated for the first carrier and one or more fields of the first DCI for the second carrier are interpreted based on the least one second BWP configuration to be activated for the second carrier.

Aspect 8: The method of any of Aspects 5-7, wherein the first DCI comprises a BWP indication field indicating the least one first BWP configuration to be activated for the first carrier and the least one second BWP configuration to be activated for the second carrier.

Aspect 9: The method of Aspect 8, wherein one or more fields of the first DCI for the first carrier are interpreted based on the least one first BWP configuration to be activated for the first carrier and one or more fields of the first DCI for the second carrier are interpreted based on the least one second BWP configuration to be activated for the second carrier.

Aspect 10: The method of any of Aspects 1-9, wherein the first DCI comprises a first DCI format configured for multi-carrier data channel scheduling, the method further comprising receiving a second DCI having an indication of a null-BWP for a carrier of the multiple carriers, interpreting the second DCI based on a second DCI format configured for single-carrier data channel scheduling, and communicating with the BS based on the second DCI as interpreted based on the second DCI format.

Aspect 11: The method of Aspect 10, wherein the null-BWP indicates that a BWP for the carrier does not include a data assignment.

Aspect 12: The method of Aspect 10 or 11, wherein the indication of the null-BWP is via a BWP indication field of the second DCI.

Aspect 13: The method of any of Aspects 10-12, wherein the method further comprises receiving a third DCI on another carrier of the multiple carriers, the third DCI having an indication of a non-null-BWP for the carrier of the multiple carriers, interpreting the third DCI based on the first DCI format configured for multi-carrier data channel scheduling, and communicating with the BS based on the third DCI as interpreted based on the first DCI format.

Aspect 14: The method of any of Aspects 1-13, wherein the at least one BWP configuration comprises a single BWP configuration for a first carrier of the multiple carriers and for a second carrier of the multiple carriers.

Aspect 15: The method of Aspect 14, wherein the first DCI comprises a BWP indication field indicating the BWP configuration to be activated on the first carrier and the second carrier.

Aspect 16: The method of Aspect 15, wherein the BWP configuration indicates a BWP that spans across the first carrier and the second carrier, and wherein the first DCI is interpreted based on the BWP.

Aspect 17: The method of Aspect 15 or 16, wherein the DCI comprises a first DCI format configured for multi-carrier data channel scheduling, the BWP configuration indicates a BWP on only the first carrier, and the method further comprises monitoring the first carrier for a second DCI in response to the BWP configuration, the second DCI having a second DCI format configured for single-carrier data channel scheduling.

Aspect 18: The method of Aspect 17, further comprising receiving the second DCI indicating a BWP that spans across the first carrier and the second carrier, the method further comprising monitoring the first carrier and the second carrier for a third DCI, the third DCI having the first DCI format configured for multi-carrier data channel scheduling.

Aspect 19: A method for wireless communication by a base station (BS), comprising generating first downlink control information (DCI) indicating whether resources are allocated for a data channel on multiple carriers, the first DCI configuring at least one BWP configuration to be activated on the multiple carriers, the first DCI being generated based on the at least one BWP configuration to be activated, transmitting the first DCI to a user equipment (UE), and communicating with the UE in accordance with the first DCI.

Aspect 20: The method of Aspect 19, further comprising transmitting a configuration for multi-carrier data scheduling, wherein the first DCI has a first DCI format configured for multi-carrier data channel scheduling in accordance with the configuration for the multi-carrier data scheduling.

Aspect 21: The method of Aspect 19 or 20, wherein the data channel comprises a physical uplink shared channel (PUSCH).

Aspect 22: The method of any of Aspects 19-21, wherein the data channel comprises a physical downlink shared channel (PDSCH).

Aspect 23: The method of any of Aspects 19-22, wherein the at least one BWP configuration comprises at least one first BWP configuration for a first carrier of the multiple carriers and at least one second BWP configuration for a second carrier of the multiple carriers.

Aspect 24: The method of Aspect 23, wherein the first DCI comprises a first BWP indication field indicating the least one first BWP configuration to be activated for the first carrier and a second BWP indication field indicating the least one second BWP configuration to be activated for the second carrier.

Aspect 25: The method of Aspect 24, wherein one or more fields of the first DCI for the first carrier are generated based on the least one first BWP configuration to be activated for the first carrier and one or more fields of the first DCI for the second carrier are generated based on the least one second BWP configuration to be activated for the second carrier.

Aspect 26: The method of any of Aspects 23-25, wherein the first DCI comprises a BWP indication field indicating the least one first BWP configuration to be activated for the first carrier and the least one second BWP configuration to be activated for the second carrier.

Aspect 27: The method of Aspect 26, wherein one or more fields of the first DCI for the first carrier are generated based on the least one first BWP configuration to be activated for the first carrier and one or more fields of the first DCI for the second carrier are generated based on the least one second BWP configuration to be activated for the second carrier.

Aspect 28: The method of any of Aspects 19-27, wherein the first DCI comprises a first DCI format configured for multi-carrier data channel scheduling, the method further comprising generating a second DCI having an indication of a null-BWP for a carrier of the multiple carriers, the second DCI being generated based on a second DCI format configured for single-carrier data channel scheduling, transmitting the second DCI to the UE, and communicating with the UE based on the second DCI.

Aspect 29: The method of Aspect 28, wherein the null-BWP indicates that a BWP for the carrier does not include a data assignment.

Aspect 30: The method of Aspect 28 or 29, wherein the indication of the null-BWP is via a BWP indication field of the second DCI.

Aspect 31: The method of any of Aspects 28-30, wherein the method further comprises generating a third DCI on another carrier of the multiple carriers, the third DCI having an indication of a non-null-BWP for the carrier of the multiple carriers, the third DCI being generated based on the first DCI format configured for multi-carrier data channel scheduling, transmitting the third DCI to the UE, and communicating with the UE based on the third DCI.

Aspect 32: The method of any of Aspects 19-31, wherein the at least one BWP configuration comprises a single BWP configuration for a first carrier of the multiple carriers and for a second carrier of the multiple carriers.

Aspect 33: The method of Aspect 32, wherein the first DCI comprises a BWP indication field indicating the BWP configuration to be activated on the first carrier and the second carrier.

Aspect 34: The method of Aspect 33, wherein the BWP configuration indicates a BWP that spans across the first carrier and the second carrier, and wherein the first DCI is generated based on the BWP.

Aspect 35: The method of Aspect 33 or 34, wherein the first DCI comprises a first DCI format configured for multi-carrier data channel scheduling, the BWP configuration indicates a BWP on only the first carrier, and the method further comprises generating a second DCI on the first carrier in response to the BWP configuration, the second DCI having a second DCI format configured for single-carrier data channel scheduling based on the BWP configuration indicating the BWP on only the first carrier and transmitting the second DCI to the UE.

Aspect 36: The method of Aspect 35, method further comprising generating a third DCI to be transmitted on the first carrier and the second carrier, the third DCI being generated based on the first DCI format configured for multi-carrier data channel scheduling in response to the second DCI indicating a BWP that spans across the first carrier and the second carrier and transmitting the third DCI to the UE.

Clause 37: An apparatus, comprising: a memory; and one or more processors coupled to the memory, the memory and the one or more processors being configured to perform a method in accordance with any one of Aspects 1-36.

Clause 38: An apparatus, comprising means for performing a method in accordance with any one of Aspects 1-36.

Clause 39: A non-transitory computer-readable medium comprising executable instructions that, when executed by one or more processors of an apparatus, cause the apparatus to perform a method in accordance with any one of Aspects 1-36.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), wireless technology such as CDMA2000®, etc. UTRA includes Wideband CDMA (WCDMA) and other variants of CDMA. CDMA2000® covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (wireless technology such as Wi-Fi®), IEEE 802.16 (wireless technology such as WiMAX®), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). CDMA2000® and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2 P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5 and/or FIG. 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication at a user equipment (UE), comprising:
  one or more memories comprising instructions; and
  one or more processors configured, individually or in any combination, to execute the instructions and cause the apparatus to:
    receive, from a network entity, a first downlink control information (DCI) indicating resources are allocated for at least one data channel on multiple carriers, wherein the first DCI comprises a joint bandwidth part (BWP) indication field for the multiple carriers for activating at least one BWP configuration on each carrier of the multiple carriers; and
    communicate with the network entity in accordance with the first DCI as based on the at least one BWP configuration.

2. The apparatus of claim 1, wherein the one or more processors are configured, individually or in any combination, to execute the instructions and cause the apparatus to receive a configuration for multi-carrier data scheduling, wherein the first DCI has a first DCI format configured for multi-carrier data channel scheduling in accordance with the configuration for the multi-carrier data scheduling.

3. The apparatus of claim 1, wherein the at least one BWP configuration comprises:

at least one first BWP configuration for a first carrier of the multiple carriers; and at least one second BWP configuration for a second carrier of the multiple carriers.

4. The apparatus of claim 3, wherein the first DCI comprises:

a first BWP indication field indicating at least one first BWP configuration to be activated for the first carrier; and a second BWP indication field indicating at least one second BWP configuration to be activated for the second carrier.

5. The apparatus of claim 4, wherein the one or more processors are configured, individually or in any combination, to execute the instructions and cause the apparatus to:

interpret one or more fields of the first DCI for the first carrier based on the at least one first BWP configuration to be activated for the first carrier; and interpret one or more fields of the first DCI for the second carrier based on the at least one second BWP configuration to be activated for the second carrier.

6. The apparatus of claim 3, wherein the first DCI comprises a BWP indication field indicating:

the at least one first BWP configuration to be activated for the first carrier; and the at least one second BWP configuration to be activated for the second carrier.

7. The apparatus of claim 6, wherein the one or more processors are configured, individually or in any combination, to execute the instructions and cause the apparatus to:

interpret one or more fields of the first DCI for the first carrier based on the at least one first BWP configuration to be activated for the first carrier; and interpret one or more fields of the first DCI for the second carrier based on the at least one second BWP configuration to be activated for the second carrier.

8. The apparatus of claim 1, wherein the first DCI comprises a first DCI format configured for multi-carrier data channel scheduling, and wherein the one or more processors are configured, individually or in any combination, to execute the instructions and cause the apparatus to:

receive a second DCI having an indication of a null-BWP for a carrier of the multiple carriers;

interpret the second DCI based on a second DCI format configured for single-carrier data channel scheduling; and communicate with the network entity based on the second DCI as interpreted based on the second DCI format.

9. The apparatus of claim 8, wherein the indication of the null-BWP is via a BWP indication field of the second DCI.

10. The apparatus of claim 8, wherein the one or more processors are configured, individually or in any combination, to execute the instructions and cause the apparatus to:

receive a third DCI on another carrier of the multiple carriers, the third DCI having an indication of a non-null-BWP for the carrier of the multiple carriers;

interpret the third DCI based on the first DCI format configured for multi-carrier data channel scheduling; and communicate with the network entity based on the third DCI as interpreted based on the first DCI format.

11. The apparatus of claim 1, wherein the at least one BWP configuration comprises a single BWP configuration for a first carrier of the multiple carriers and for a second carrier of the multiple carriers.

12. The apparatus of claim 11, wherein the first DCI comprises a BWP indication field indicating the BWP configuration to be activated on the first carrier and the second carrier.

13. The apparatus of claim 12, wherein the BWP configuration indicates a BWP that spans across the first carrier and the second carrier, and wherein the first DCI is interpreted based on the BWP.

14. The apparatus of claim 12, wherein:

the DCI comprises a first DCI format configured for multi-carrier data channel scheduling;

the BWP configuration indicates a BWP on only the first carrier; and the one or more processors are configured, individually or in any combination, to execute the instructions and cause the apparatus to monitor the first carrier for a second DCI in response to the BWP configuration, the second DCI having a second DCI format configured for single-carrier data channel scheduling.

15. The apparatus of claim 14, wherein the one or more processors are configured, individually or in any combination, to execute the instructions and cause the apparatus to receive the second DCI indicating a BWP that spans across the first carrier and the second carrier, and monitor the first carrier and the second carrier for a third DCI, the third DCI having the first DCI format configured for multi-carrier data channel scheduling.

16. An apparatus for wireless communication at a network entity, comprising:

one or more memories comprising instructions; and one or more processors configured, individually or in any combination, to execute the instructions and cause the apparatus to:

generate a first downlink control information (DCI) indicating resources are allocated for at least one data channel on multiple carriers, wherein the first DCI comprises a joint bandwidth part (BWP) indication field for the multiple carriers for activating at least one BWP configuration on each carrier of the multiple carriers, the first DCI being generated based on the at least one BWP configuration to be activated;

transmit the first DCI to a user equipment (UE); and communicate with the UE in accordance with the first DCI.

17. The apparatus of claim 16, wherein the one or more processors are configured, individually or in any combination, to execute the instructions and cause the apparatus to transmit a configuration for multi-carrier data scheduling, wherein the first DCI has a first DCI format configured for multi-carrier data channel scheduling in accordance with the configuration for the multi-carrier data scheduling.

18. The apparatus of claim 16, wherein the at least one BWP configuration comprises:

at least one first BWP configuration for a first carrier of the multiple carriers; and at least one second BWP configuration for a second carrier of the multiple carriers.

19. The apparatus of claim 18, wherein the first DCI comprises:

a first BWP indication field indicating the at least one first BWP configuration to be activated for the first carrier; and a second BWP indication field indicating the at least one second BWP configuration to be activated for the second carrier.

20. The apparatus of claim 19, wherein:

one or more fields of the first DCI for the first carrier are generated based on the at least one first BWP configuration to be activated for the first carrier; and one or more fields of the first DCI for the second carrier are generated based on the at least one second BWP configuration to be activated for the second carrier.

21. The apparatus of claim 18, wherein the first DCI comprises a BWP indication field indicating:

the at least one first BWP configuration to be activated for the first carrier; and the at least one second BWP configuration to be activated for the second carrier.

22. The apparatus of claim 21, wherein:

one or more fields of the first DCI for the first carrier are generated based on the at least one first BWP configuration to be activated for the first carrier; and one or more fields of the first DCI for the second carrier are generated based on the at least one second BWP configuration to be activated for the second carrier.

23. The apparatus of claim 16, wherein the first DCI comprises a first DCI format configured for multi-carrier data channel scheduling, and wherein the one or more processors are configured, individually or in any combination, to execute the instructions and cause the apparatus to:

generate a second DCI having an indication of a null-BWP for a carrier of the multiple carriers, the second DCI being generated based on a second DCI format configured for single-carrier data channel scheduling;

transmit the second DCI to the UE; and communicate with the UE based on the second DCI.

24. The apparatus of claim 23, wherein the one or more processors are configured, individually or in any combination, to execute the instructions and cause the apparatus to:

generate a third DCI on another carrier of the multiple carriers, the third DCI having an indication of a non-null-BWP for the carrier of the multiple carriers, the third DCI being generated based on the first DCI format configured for multi-carrier data channel scheduling;

transmit the third DCI to the UE; and communicate with the UE based on the third DCI.

25. The apparatus of claim 16, wherein the at least one BWP configuration comprises a single BWP configuration for a first carrier of the multiple carriers and for a second carrier of the multiple carriers.

26. The apparatus of claim 25, wherein the first DCI comprises a BWP indication field indicating the BWP configuration to be activated on the first carrier and the second carrier.

27. The apparatus of claim 26, wherein:

the first DCI comprises a first DCI format configured for multi-carrier data channel scheduling;

the BWP configuration indicates a BWP on only the first carrier; and the one or more processors are configured, individually or in any combination, to execute the instructions and cause the apparatus to:

generate a second DCI on the first carrier in response to the BWP configuration, the second DCI having a second DCI format configured for single-carrier data channel scheduling based on the BWP configuration indicating the BWP on only the first carrier; and transmit the second DCI to the UE.

28. The apparatus of claim 27, wherein the one or more processors are configured, individually or in any combination, to execute the instructions and cause the apparatus to:

generate a third DCI to be transmitted on the first carrier and the second carrier, the third DCI being generated based on the first DCI format configured for multi-carrier data channel scheduling in response to the second DCI indicating a BWP that spans across the first carrier and the second carrier; and transmit the third DCI to the UE.

29. A method for wireless communication at a user equipment (UE), comprising:

receiving, from a network entity, a first downlink control information (DCI) indicating resources are allocated for at least one data channel on multiple carriers, wherein the first DCI comprises a joint bandwidth part (BWP) indication field for the multiple carriers for activating at least one BWP configuration on each carrier of the multiple carriers; and communicating with the network entity in accordance with the first DCI based on the at least one BWP configuration.

30. A method for wireless communication at a network entity, comprising:

generating a first downlink control information (DCI) indicating resources are allocated for at least one data channel on multiple carriers, wherein the first DCI comprises a joint bandwidth part (BWP) indication field for the multiple carriers for activating at least one BWP configuration on each carrier of the multiple carriers, the first DCI being generated based on the at least one BWP configuration to be activated;

transmitting the first DCI to a user equipment (UE); and communicating with the UE in accordance with the first DCI.

* * * * *